No. 890,460. PATENTED JUNE 9, 1908.
A. M. SMITH.
BARREL REPLACER.
APPLICATION FILED MAY 17, 1907.

WITNESSES
INVENTOR
AUTHOR M. SMITH
BY Paul Paul
HIS ATTORNEYS

UNITED STATES PATENT OFFICE.

AUTHOR MASON SMITH, OF MINNEAPOLIS, MINNESOTA.

BARREL-REPLACER.

No. 890,460.  Specification of Letters Patent.  Patented June 9, 1908.

Application filed May 17, 1907. Serial No. 374,295.

*To all whom it may concern:*

Be it known that I, AUTHOR MASON SMITH, of Minneapolis, Hennepin county, Minnesota, have invented certain new and useful Improvements in Barrel-Replacers, of which the following is a specification.

The object of my invention is to provide a device by means of which a barrel can be easily and quickly placed on a rack or removed therefrom.

A further object is to provide a device which while adapted for use in handling barrels of various kinds is particularly designed for use in placing barrels filled with wine or other liquors on a rack for supporting them in a horizontal position.

The invention consists generally in a suitable frame adapted to fit on the edge of the barrel rack and a roller mounted in said frame and having a concave face to receive the surface of the barrel.

Figure 1:
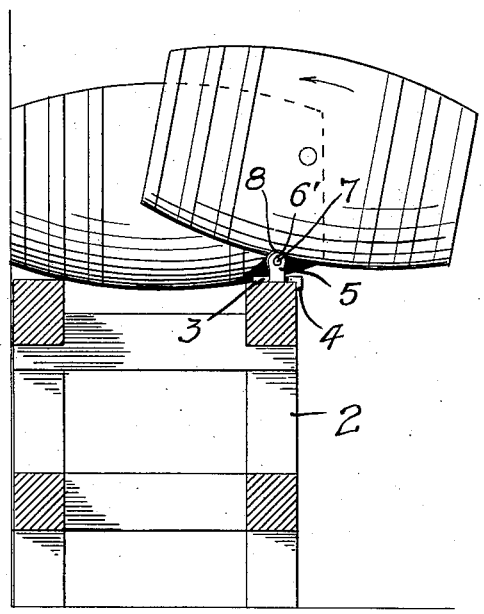
Figure 3:
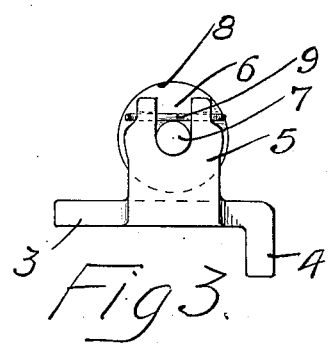
Figure 2:
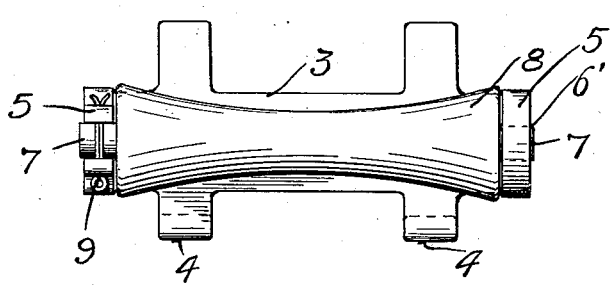
Figure 4:
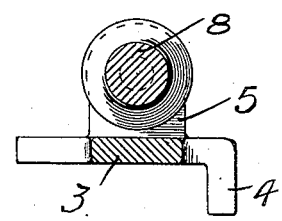

In the accompanying drawings, forming part of this specification, Fig. 1 is a sectional view illustrating the manner of using my invention. Fig. 2 is a plan view of the barrel-placing device. Fig. 3 is an end view of the same. Fig. 4 is a transverse sectional view.

In the drawing, 2 represents a rack whereon the liquor barrels are supported in a horizontal position. 3 is a frame, preferably of metal, adapted to rest upon the top of said rack and having downwardly turned lugs 4 which engage the front of the rack and prevent the device from being displaced when in use. Brackets 5 are provided at each end of the frame, one of said brackets having a recess 6 open at the top and the other bracket having a hole 6' therethrough. Gudgeons 7 are provided on the ends of a roller 8, and adapted to enter the recess 6 and the hole 6' and turn freely therein. The roller 8 has a concave surface to fit the surface of the barrel and form a support therefor when the barrel is being placed on the rack or removed therefrom. A cotter pin 9 extends across the recess 6 and locks the roller in the bracket. When the barrel has been adjusted on the rack its forward end is raised sufficiently to release the roller, and the frame is then moved to another place on the rack and the operation repeated.

By this device a great deal of labor and time are saved in placing the barrels on the rack or removing those that may be thereon.

I claim as my invention:

1. A barrel replacer comprising a frame having parallel side portions with a cross piece connecting them, said frame being adapted to rest upon a flat surface and the forward ends of said side pieces having downwardly turned portions forming lugs to bear on a vertical face and prevent backward horizontal movement of said frame and said side pieces having upright standards formed thereon with bearings in the upper ends of said standards, and a roller having a concave face with its ends journaled in said bearings and said roller being adapted to receive the periphery of a barrel and roll when the barrel is moved endwise, substantially as described.

2. The combination, with a barrel-supporting-rack, of a barrel replacer comprising a frame adapted to rest on the forward portion of said rack and movable from place to place thereon, said frame having downwardly turned lugs to engage the rack and prevent backward movement of said frame when a barrel is being moved thereon, and a roller having a concave surface journaled on said frame and arranged to revolve when a barrel is moved backwardly or forwardly on said rack, substantially as described.

In witness whereof, I have hereunto set my hand this 15th day of May 1907.

AUTHOR MASON SMITH.

Witnesses:
 I. M. PYATT,
 J. B. ERA.